United States Patent [19]

Kammerl

[11] Patent Number: 5,229,546
[45] Date of Patent: Jul. 20, 1993

[54] FLUSH-MOUNTED APPLIANCE OUTLET AS COMBINATION UNIT

[75] Inventor: Franz Kammerl, Holzheim am Forst, Fed. Rep. of Germany

[73] Assignee: Siemens Aktiengesellschaft, Munich, Fed. Rep. of Germany

[21] Appl. No.: 698,937

[22] Filed: May 13, 1991

[30] Foreign Application Priority Data

May 21, 1990 [EP] European Pat. Off. ............ 90109602

[51] Int. Cl.⁵ .................................................. H02G 3/16
[52] U.S. Cl. ................................ 174/53; 200/297; 439/535; 439/538
[58] Field of Search ............... 174/53, 66; 439/535, 439/536, 538, 539; 200/296, 297

[56] References Cited

U.S. PATENT DOCUMENTS

| 1,933,358 | 10/1933 | Almcrantz | 439/535 X |
| 2,397,688 | 4/1946 | Osinski | 174/53 |
| 2,433,917 | 1/1948 | McCartney | 174/53 |
| 2,908,743 | 10/1959 | Premoshis | 174/53 |
| 3,432,611 | 3/1969 | Gaines et al. | 174/66 |
| 3,437,737 | 4/1969 | Wagner | 174/53 X |
| 3,562,468 | 2/1971 | Stefani | 174/53 X |
| 5,036,168 | 7/1991 | Kikuchi et al. | 174/53 X |

FOREIGN PATENT DOCUMENTS 1465268 2/1969 Fed. Rep. of Germany .
2647777 11/1977 Fed. Rep. of Germany .

Primary Examiner—Leo P. Picard
Assistant Examiner—David A. Tone
Attorney, Agent, or Firm—Kenyon & Kenyon

[57] ABSTRACT

A flush-mounted appliance outlet for a combination unit to be used in wiring practice, and having several types of components such as operating controls or junctions. The flush-mounted appliance outlet is constructed such that each receptacle is held on a mounting bracket in an outlet box. The mounting brackets are adapted to be covered by a common cover plate. The inside width of the cover plate that is used for mounting fields of components, such as a receptacle, used in building wiring systems, is constructed wider than that the dimensions of the outer profile of the mounting bracket for such a component.

11 Claims, 1 Drawing Sheet

FLUSH-MOUNTED APPLIANCE OUTLET AS COMBINATION UNIT

BACKGROUND OF THE INVENTION

The invention relates to a flush-mounted appliance outlet for a combination unit that is to be used in wiring practice and has several types of components, such as operating controls or junctions. More particularly the present invention relates to a flush-mounted appliance outlet for a combination unit in which each receptacle is held on in an outlet box by a mounting bracket which is adapted so that it is partially covered by a common cover plate.

Flush-mounted appliance outlets are known in a wide variety of combinations for use in wiring operations. For instance, common cover plates used for a plurality of components, which can be either operating controls or junctions, are known as combination plates. In building wiring systems, operating controls and junctions are required and are sought to be combined with components used in conventional wiring practice such as outlets. The components used in a building wiring system are connected through a busway. Thus, in order to install and remove components currently used in a building wiring system, the cover plate has to be removed, resulting in the exposure of terminals. This exposure violates safety regulations.

The present invention is directed to the problem of providing a flush-mounted appliance outlet for a combination unit to permit the use of components employed in building wiring systems along with those used in conventional wiring practice.

SUMMARY OF THE INVENTION

This invention solves this problem by making the inside width of the cover plate, which is to be used in mounting fields corresponding to components employed in building wiring systems, wider than that which corresponds to the dimensions of the outer profile of the mounting brackets for such components. Thus, it is now possible through slight modifications of a conventional combination plate, which are in a manner consistent with the pertinent safety regulations, to install components employed in building wiring systems adjacent to those used in conventional wiring-practice without any expenditure for materials.

The cover plate forms the bearing surfaces for the manual operating controls, thereby shortening the mounting brackets. The manual operating controls can then be supported as usual on the cover plate without interfering with the principle underlying the invention. The installation and removal of receptacles or components used in conventional wiring practice requires removal of the cover plate, while installation and removal of receptacles or components employed in building wiring systems can be accomplished while the cover plate remains in place. In the above-described design, the bearing surfaces extend on the cover plate as far as the angled corners of the mounting bracket.

DETAILED DESCRIPTION

Figure 1:
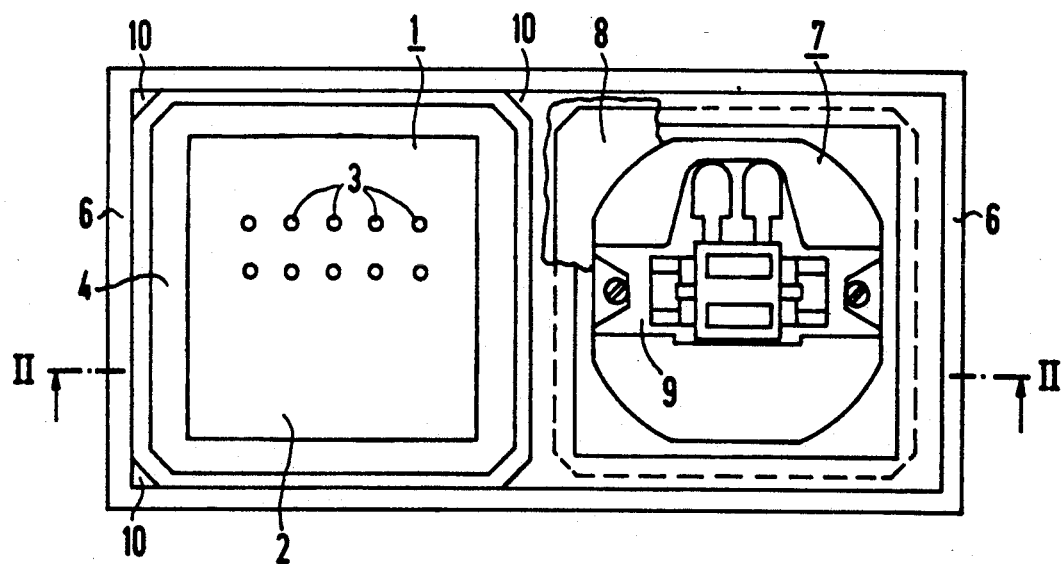
FIG. 1 is a frontal view of a combination unit containing an appliance outlet constructed according to the principles of the invention for two types of components.

As shown in FIG. 1 a flush-mounted appliance outlet is constructed for a combination unit having two types of components. In this embodiment, a left-hand component in FIG. 1 is constructed as an operating control or a junction, either of which is typically used in a building wiring system, while a right-hand component in FIG. 1 is used in conformity with conventional wiring practice such as for use as an electrical outlet.

When the manual operating control is cut away, the receptacle of a house wiring switch is visible. In the left mounting field 1, which is designed for building wiring systems, a receptacle 2 with sockets 3 for plug pins of the manual operating control is shown. The receptacle 2 of the component used in building wiring systems is in contact with a mounting strap 4 whereby the receptacle is mounted and supported on the edge of a flush-mounted appliance outlet. A cover plate 6 may be placed outward of the mounting strap 4. In this embodiment, the cover plate 6 consists of a left and right section. On the left section there is a mounting field for a component used in building wiring systems, and on the right section there is a mounting field 7 for a component used in conventional wiring practice. Generally the cover plate 6 has a greater inside width in mounting field 1 for components employed in building wiring systems than that which corresponds to the dimensions of the outer profile of the mounting bracket 4 of such wiring systems. Thus, the mounting bracket 4 can be inserted and removed through the cover plate 6 with the receptacle of a component attached to the mounting bracket. In the mounting field 7 which is for a component used in conventional wiring practice, the design is such that the cover plate 6 extends over the mounting bracket 8 of a component. As seen in FIG. 1, the cover plate 6 is shown partly broken away to show the mounting bracket 8 of the component used in conventional wiring practice. In this embodiment, a receptacle 9 for a narrow component to be used in wiring practice is fastened to the mounting bracket 8.

The cover plate 6 of FIG. 1 forms bearing surfaces for manual operating controls. In this embodiment, the mounting field 1 for a component used in building wiring systems comprises triangular bearing surfaces 10. The bearing surfaces 10, of the mounting field for components employed in building wiring systems, extend on the cover plate as far as the angled corners of the mounting bracket 4. In the mounting field 7 for a narrow component to be used in wiring practice, the entire area of the cover plate 6, which is bounded by the outer periphery, serves as a bearing surface.

Figure 2:
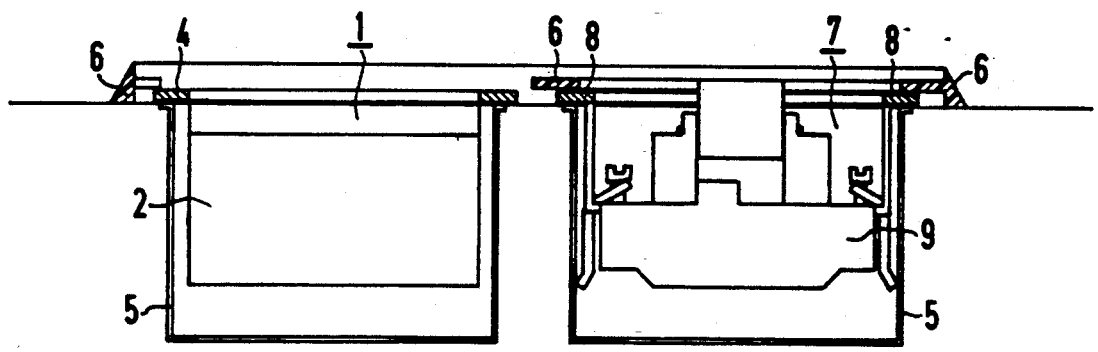
FIG. 2 is a cross-sectional view taken along line II—II of FIG. 1.

As is apparent also from the sectional view of FIG. 2, the cover plate 6 in mounting field 7 extends beyond the mounting bracket 8 for a component used in conventional wiring practice. Typically, these types of mounting brackets are called hangers. On the other hand, the mounting bracket 4 for a component used in building wiring systems is exposed in the cover plate 6. Thus, the mounting bracket 4 can be installed or removed without the cover plate 6 being removed.

What is claimed is:

1. A flush-mounted appliance outlet for use in a combination unit in wiring practices comprising:
   a) a cover plate having bearing surfaces and an open region;

b) at least one mounting bracket having an outer profile with angled corners;
c) at least one receptacle mounted on said mounting bracket; and
d) an outlet box housing said mounting bracket wherein said open region of the cover plate is larger than said outer profile of the mounting bracket such that when the cover plate is positioned over the mounting bracket and receptacle, the receptacle may be removed without removal of the cover plate.

2. A flush-mounted appliance outlet according to claim 1 wherein said bearing surfaces are triangular and extend from said cover plate as far as said angled corners of said mounting bracket.

3. A flush-mounted appliance outlet for use in a combination unit in wiring practices comprising:
a) a cover plate having a first and second section, wherein said first section has an open region;
b) a first and second mounting bracket, each having an outer dimension with angled corners;
c) an outlet box having a first mounting field and second mounting field positioned adjacent to said first mounting field, in which said first and second mounting brackets are respectively disposed; and
d) a first receptacle mounted in said first mounting bracket, and a second receptacle mounted in said second mounting bracket;
wherein said first and second section of the cover plate are positioned over said first and second mounting brackets respectively, said first open region of the cover plate being larger than the outer dimension of said first mounting bracket, such that when the cover plate is positioned said first receptacle may be removed without removal of the cover plate.

4. A flush-mounted appliance outlet for use in a combination unit in wiring practices according to claim 3 wherein said second section of the cover plate extends over the outer dimension of said second mounting bracket, such that said second receptacle is shielded and may not be removed without removal of said cover plate.

5. A flush-mounted appliance outlet according to claim 3, wherein said cover plate further includes first and second bearing surfaces, for external control elements or manual operating controls, provided at said first and second sections of the cover plate respectively.

6. A flush-mounted appliance outlet according to claim 5, wherein said first bearing surfaces are triangular and extend from said cover plate as far as said angled corners of the first mounting bracket.

7. A flush-mounted appliance outlet according to claim 5, wherein said second bearing surface is said second section of the cover plate.

8. A flush-mounted appliance outlet according to claim 3, wherein said first receptacle is of a first type typically used in a building wiring system.

9. A flush-mounted appliance outlet according to claim 8, wherein said second receptacle is of a second type typically used in conventional wiring practices.

10. A flush-mounted appliance outlet according to claim 9 wherein said second receptacle of a second type is an electrical outlet.

11. A flush-mounted appliance outlet according to claim 9, wherein said second receptacle of a second type is an electrical switch.

* * * * *